United States Patent Office 3,143,184
Patented Aug. 4, 1964

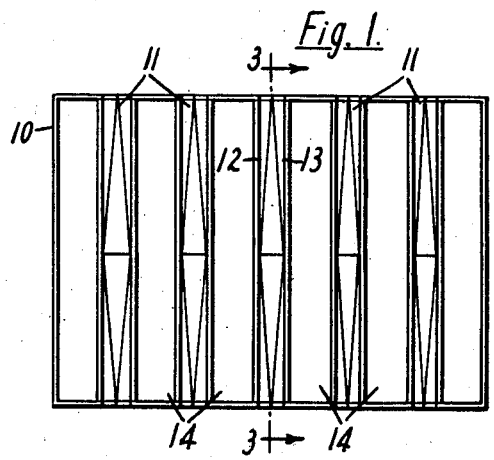
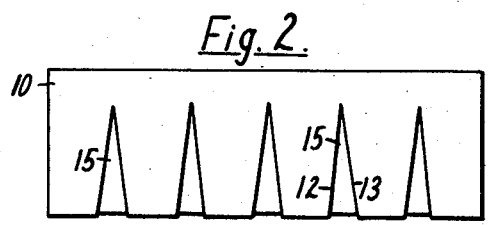
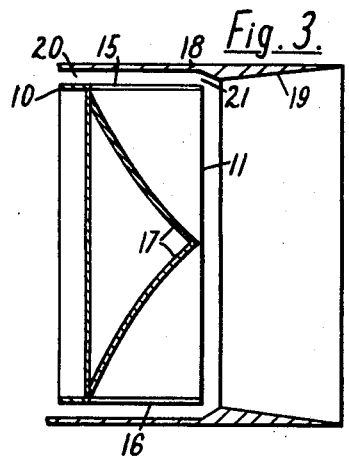

3,143,184
NOZZLE FOR SUPPRESSING JET NOISE
Ralph Murch Denning and William James Lewis, both of Bristol, England, assignors to Bristol Siddeley Engines Limited, Bristol, England, a British company
Filed Oct. 26, 1961, Ser. No. 147,869
Claims priority, application Great Britain Oct. 31, 1960
1 Claim. (Cl. 181—51)

This invention concerns gas discharge nozzles which are constructed so that the tendency of the gas jet to generate undesirable noise is interfered with. Such nozzles are particularly sought after for aircraft power plants.

According to this invention a gas discharge nozzle comprises a gas duct with an open discharge end, the end being divided into several gas passages by splitters which extend across the duct, each splitter being V-sectioned in planes which extend up-and-downstream at right angles to the splitters, the apex of each V being upstream so that the passages are convergent downstream, and the splitters each being hollow and having an inlet for air to enter the interior of the splitter, and an open rear end to discharge the air.

Preferably where each splitter joins a wall of the duct there is an opening in the wall, which serves as an inlet for the air.

The air which enters the interior of the splitters may be ambient air induced by the gas flow, boundary layer air, ram air or air tapped from an engine compressor system.

The accompanying drawings show two examples of nozzles according to the present invention. In these drawings:

FIGURES 1 and 2 are respectively an end view and plan view of one nozzle;

FIGURE 3 is a section in the vertical plane 3—3 in FIGURE 1, also showing a shroud fitted to the nozzle for supersonic flow;

Figure 4:
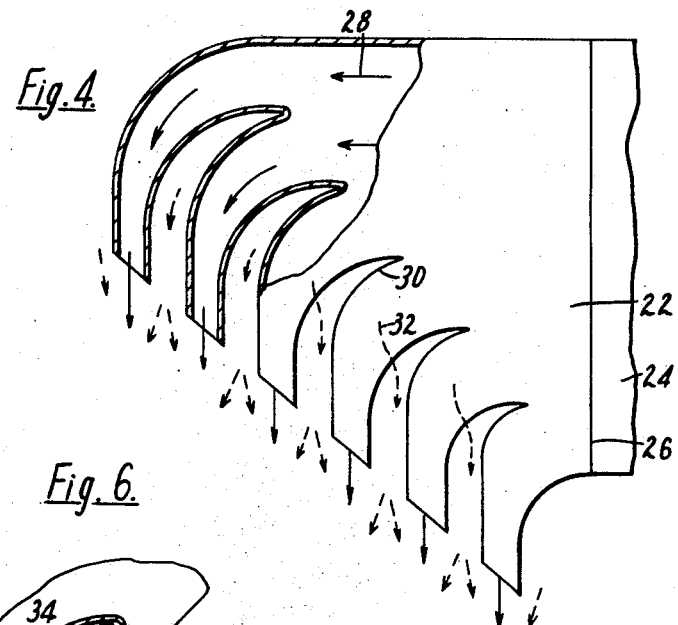
FIGURE 4 is a plan, partly broken away, of a second nozzle.
Figure 6:
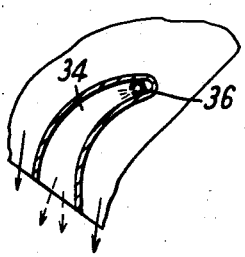

FIGURE 6 corresponds to part of FIGURE 4 and shows a modification.

The nozzle 10 comprises a duct of generally oblong end profile which is provided with a row of hollow V-shaped splitters 11 which extend across the nozzle passage. The walls 12, 13 of each splitter 11 diverge towards the nozzle outlet so as to form between adjacent splitters a series of vertically elongated convergent passages 14 for a hot gaseous jet flowing through the nozzle 10. The V-shaped splitters 11 which are open at the nozzle outlet are also open at their upper and lower ends (thus in plan the nozzle has a serrated appearance) to form inlets 15, 16 for air to enter each splitter downwards through the upper inlet 15 and upwards through the lower inlet 16, the air leaving the open rear end of each splitter at the nozzle outlet. The flow of air is induced by the flow of gas through the nozzle. Air deflector plates 17 are fitted within the splitters to guide the flow of air with least pressure loss.

In operation, the gas reaching the nozzle 10 is split up by the splitters 11 into separate flows which pass through the elongated convergent passages 14 to be discharged from the nozzle as a layered jet comprising a series of horizontally-spaced vertical layers of gas between which streams of relatively cold air issue from the open-ended splitters 11. The air passing through the splitters 11 cools their walls, and the resulting heat transference from the narrow flows of gas in the passages 14 absorbs energy from the gas. In addition the divergence of the walls 12, 13 causes the air streams to be discharged with a lateral component of velocity towards the gas layers, so as to assist the intermingling of the air with the gas and consequent absorption of gas energy by the air. The energy absorption results in a silencing effect on the jet discharge.

As shown in FIGURE 3, when the nozzle is employed to silence the propulsive jet of a jet aircraft designed for flight at supersonic speed, the nozzle with its convergent passages 14 is preferably fitted with a shroud 18 having a divergent portion 19 which extends downstream of the nozzle 10. Cooling air is passed through the annular passage 20 between the shroud and the nozzle to enter the hollow splitters through their inlets 15, 16 and also to flow through the annular outlet 21 between the downstream end of the nozzle and the shroud.

Figure 5:
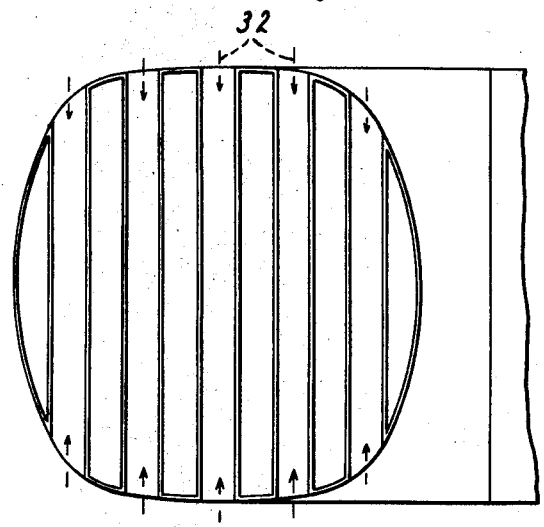
FIGURE 5 is a rear view of the second nozzle.

The nozzle shown in FIGURES 4 and 5 is intended for use in an aircraft which can be caused to take off substantially vertically and thereafter fly horizontally, by rotating the nozzle to vary the direction of discharge from it. The gas flow through the nozzle may be air tapped from the output of a compressor, or may be combustion products from a combustion chamber. The nozzle 22 is mounted on the end of a fixed duct 24. On the line of junction 26 there is an annular bearing and seal, details of which are not shown as they are not relevant to the present invention. The flow of gas through the nozzle 22 is indicated by solid arrows 28, 29. The nozzle is a duct with a circular section inlet end and shaped in the form of an elbow bend at its outlet end so as to turn the flow through about 90°. By rotation of the nozzle 22 relative to the fixed duct 24, it is possible to discharge the gas rearwards, as shown in FIGURE 4, or downwards, or in an intermediate direction.

The nozzle is provided with a row of splitters 30 which are V-shaped in plan, and which extend across the outlet end perpendicular to planes containing the maximum curvature of the elbow bend, i.e. perpendicular to the plane of the paper in FIGURE 4. The splitters are curved to correspond to the curve of the duct of the nozzle and so constitute a cascade of corner vanes, which turn the gas flow through the nozzle, as indicated by the full-line curved arrows 29 in FIGURE 4. These splitters open through the top and bottom walls of the duct, so that flow of gas serves to induce flow of ambient air as indicated by broken arrows 32.

In rear elevation, as shown in FIGURE 5, the outlet from the duct has a shape of a somewhat rounded rectangle.

In operation, the closely spaced sheet-like layers of gas which are discharged from between the splitters immediately commence to mingle with the sheet-like layers of air which are discharged from the rear ends of the splitters, and this tends to reduce the noise of the jet.

FIGURE 6 shows an alternative arrangement in which the splitters do not open through the walls of the duct, but instead air is supplied into the interior 34 of each splitter by means of a perforated pipe 36. The pipes 36 may be connected to a common air supply (not shown).

We claim:

A gas discharge nozzle comprising a duct having a circular section inlet end and an elbow bend outlet end, and a plurality of splitters extending across the outlet end perpendicular to planes containing the maximum curvature of the elbow bend, the splitters being curved to correspond to the curve of the elbow bend so as to constitute a cascade of corner vanes, each splitter being hollow and having a closed upstream end facing the inlet end of the duct and an open downstream end of elongated parallel sided cross section.

References Cited in the file of this patent

UNITED STATES PATENTS

| | | |
|---|---|---|
| 2,927,423 | Wisniowski | Mar. 8, 1960 |
| 2,986,877 | Emmons et al. | June 6, 1961 |
| 3,025,667 | Moorehead | Mar. 20, 1962 |

FOREIGN PATENTS

| | | |
|---|---|---|
| 595,391 | Canada | Mar. 29, 1960 |
| 768,553 | Great Britain | Feb. 20, 1957 |
| 844,179 | Great Britain | Aug. 10, 1960 |
| 997,262 | France | Sept. 12, 1951 |
| 1,157,063 | France | Dec. 23, 1957 |

OTHER REFERENCES

Willard D. Coles et al.: Full-scale Investigation of Several Jet-Engine Noise-Reduction Nozzles, National Advisory Committee for Aeronautics (NACA), Technical Note 3974 (Washington: NACA, April 1957), pages 7–10 and 24–27 of particular pertinence.